US007010302B1

(12) United States Patent
Nakajima et al.

(10) Patent No.: US 7,010,302 B1
(45) Date of Patent: Mar. 7, 2006

(54) PACKET TRANSMISSION METHOD, PACKET TRANSMISSION SYSTEM AND PACKET DATA TRANSMISSION MEDIUM ON MOBILE COMMUNICATIONS NETWORK SYSTEM

(75) Inventors: Akihisa Nakajima, Tokyo (JP); Hiroshi Nakamura, Kanagawa (JP); Teruki Niwa, Kanagawa (JP); Yukichi Saito, Kanagawa (JP); Tomoyuki Ohtani, Kanagawa (JP); Hideo Morita, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 09/462,295

(22) PCT Filed: May 7, 1999

(86) PCT No.: PCT/JP99/02384

§ 371 (c)(1),
(2), (4) Date: Jan. 6, 2000

(87) PCT Pub. No.: WO99/59301

PCT Pub. Date: Nov. 18, 1999

(30) Foreign Application Priority Data

May 8, 1998 (JP) ................................ 10-126397

(51) Int. Cl.
*H04Q 7/20* (2006.01)

(52) U.S. Cl. ...................... 455/445; 455/422; 455/458; 455/435.2; 455/436; 455/438; 455/439; 455/432.1; 370/331; 370/354; 370/401; 370/338

(58) Field of Classification Search ................ 455/422, 455/445, 458, 435.2, 436, 438, 439, 432.1; 370/401, 338
See application file for complete search history.

(56) References Cited

U.S. PATENT DOCUMENTS

| | | | | |
|---|---|---|---|---|
| 5,442,633 | A * | 8/1995 | Perkins et al. | 370/331 |
| 6,215,790 | B1 * | 4/2001 | Voit et al. | 370/354 |

FOREIGN PATENT DOCUMENTS

| | | |
|---|---|---|
| JP | 06177887 A | 6/1994 |
| JP | 10013910 A | 1/1998 |

OTHER PUBLICATIONS

David C. Lee, Daniel L. Lough, Scott F. Midkiff, Nathaniel J. Davis IV and Phillip E. Benchoff, "The Next Generation of the Internet: Aspects of the Internet Protocol Version 6", IEEE Network, Jan./Feb. 1998.

(Continued)

*Primary Examiner*—Joseph Feild
*Assistant Examiner*—David Nguyen
(74) *Attorney, Agent, or Firm*—Workman Nydegger

(57) ABSTRACT

An address structure in mobile communications network facilitating routing of a packet. At the initial position of the address, is located a prefix or the like indicating the type of the address structure, which indicates the present mobile communications network system, for example. At the next position, a location address (LA) is located characterizing the present invention. The location address is usually placed at the position of a subnetwork address. The location address (LA) is provided for each mobile switching system, and constitutes part of an IP address of a user using a mobile station under the control of the mobile switching system. At the final position, is located a user identifier (user ID) which is used for identifying a user, and is provided uniquely for each user. The IP address in accordance with the present invention can be split into the foregoing three sections, part of which includes the location address and user identifier indicating the location of the mobile station in the mobile communications network, thereby enabling the identification of the user in the mobile communications network system and the control of the packet transmission.

2 Claims, 13 Drawing Sheets

OTHER PUBLICATIONS

Kazuhiro Oranoue and Tomoki Ohsawa, "IP Mobility Support with IP-Squared ($IP^2$) Encapsulation Technique", IEIC Trans. Commun., vol. E80-B, No 8 Aug. 1997.

Fumio Teraoka, Keisuke Uehara, Hideki Sunahara and Jun Murai, "VIP: A Protocol Providing Host Mobility", Communication of the ACM Aug. 1994/vol. 37, No. 8.

Akihisa Nakajima, Hiroshi Nakamura, and Teruki Niwa NTT Mobile Communications Network, Inc., "The Convergence Between IMT-2000 and The Internet", 1998 General Meeting of the Institute of Electronics, Information and Communication Engineers.

Jinmei Tatuya, Itoh Jun-ichiro and Sumikawa Munechika, "An effective method of using Ipv6 auto configuration under mobile environments", Ipv6, Dec. 4, 1998.

"Latest Computer/ Communication/ and Standard Technology in Broadcasting Explained by way of Illustration" issued by Kyobo Mungo, P.P. 90-100 (South Korean Version Issue Date: Aug. 13, 1999, Japanese Original Issue Month: Mar., 1998).

Theodore S. Rappaport, Wireless Communication Principles and Practice, p.p. 479-481 (1996).

IP Addressing and Routing in a Local Wireless Network Danny Cohen, Jonathan B. Postel and Raphael Rom 1992 IEEE.

* cited by examiner

PACKET TRANSMISSION METHOD, PACKET TRANSMISSION SYSTEM AND PACKET DATA TRANSMISSION MEDIUM ON MOBILE COMMUNICATIONS NETWORK SYSTEM

TECHNICAL FIELD

The present invention relates to a packet transmission method, a packet transmission system and a packet data transmission medium for transmitting digital information on a mobile communications network system, and more particularly to a packet transmission method, a packet transmission system and a packet data transmission medium according to the IP, the Internet protocol.

BACKGROUND ART

Conventionally, there has been a packet transmission system such as the Internet constructed on a mobile communications network system. The conventional system carries out unique control inherent in the mobile network to achieve location address management and pursuit calling inherent in mobile radio communications. To perform the unique control inherent in the mobile radio communications on the packet information sent from other systems, IP datagram encapsulation according to the known communications RFC technique is carried out (see, pp. 800–803 of "Internet RFC handbook" supervised by Hidematsu KASANO, Ascii Corp. Tokyo, 1998). It converts in a fixed node of the mobile communications network system the packet information into a packet according to the protocol of the mobile communications network system by encapsulating the packet information with a packet according to the protocol in the mobile communications network system, and transmits the packet through the mobile communications network system. The packet is transmitted to a mobile station after removing the encapsulating packet in a fixed node near the mobile station in the mobile communications network system.

Such a conversion, however, imposes overload on the node that carries out the conversion according to the protocol of the mobile communications network system.

Besides, the encapsulation of the packet increases an amount of the information to be transmitted by that amount.

In addition, the transmission path can be lengthened because the information is transmitted to the mobile station through the fixed node that carries out the protocol conversion service.

However, constructing a seamless system matching an external protocol is difficult because the transmission path of the packet cannot be identified as in the fixed network because of the roaming of a terminal in the mobile communications network system.

An object of the present invention is to construct on the mobile communications network system a seamless packet transmission system that can obviate the necessity for carrying out the protocol conversion between the mobile communications network system and an external packet transmission system.

DISCLOSURE OF THE INVENTION

To accomplish the object, the present invention provides a packet transmission method in a mobile communications network system for routing a packet using an IP address between a user in a mobile communications network system and a user inside or outside the mobile communications network system, the packet transmission method comprising the steps of:

storing a location address and a user identifier of the user in the mobile communications network system into the IP address within a packet transmitted and/or received by the user in the mobile communications network system; and routing the packet in accordance with the location address and the user identifier in the IP address. This makes it possible to implement a packet transmission method based on the IP address throughout the mobile communications network system and the external system.

The location address may have a hierarchical structure.

The hierarchical structure may comprise at least a network identifier indicating a subdivided network of the mobile communications network, and a node identifier provided in connection with a termination node of an access link in the network.

The packet transmission method further comprising the steps of:

routing the packet to the network in accordance with the network identifier;

routing the packet to the termination node in accordance with the node identifier; and transmitting the packet from the termination node by selecting an access link of a related mobile communications network in accordance with the user identifier.

The packet transmission method further comprising the steps of:

routing the packet to the termination node, referring to the location address in its entirety; and transmitting the packet from the termination node by selecting an access link of a related mobile communications network in accordance with the user identifier.

At least the location address constituting the IP address may be transmitted to the user in the mobile communications network system or to the user inside or outside the mobile communications network system, when an access link is established between the user in the mobile communications network system and the mobile communications network system.

The packet transmission method further comprising the steps of:

storing an IP address in connection with a domain name in a database in a domain-name server;

having the domain-name server send the IP address back to the user in the mobile communications network system or to the user inside or outside mobile communications network system in response to an inquiry from the user about the IP address using the domain name; and having the user that sends the inquiry carry out a packet communication using the IP address sent back.

The inquiry is sent to the domain-name server, if the access link is not established then an access link is established.

The domain-name server generates the IP address by acquiring from the mobile communications network system a location address of the user in the mobile communications network system. Thus managing the IP address by the domain-name server enables the packet communications by the IP address including a location address.

The packet including the IP address may be routed in accordance with the IP address with or without encapsulating the packet.

The foregoing object of the present invention can also be implemented in the form of the following packet transmission system. Specifically, the present invention provides a packet transmission system in a mobile communications network system for routing a packet using an IP address between a user in a mobile communications network system and a user inside or outside the mobile communications network system, the packet transmission system comprising:

means for storing a location address and a user identifier of the user in the mobile communications network system into the IP address within a packet transmitted and/or received by the user in the mobile communications network system; and means for routing the packet in accordance with the location address and the user identifier in the IP address. This makes it possible to implement a packet transmission system based on the IP address throughout the mobile communications network system and the external system.

The location address may have a hierarchical structure. The hierarchical structure may comprise at least a network identifier indicating a subdivided network of the mobile communications network, and a node identifier provided in connection with a termination node of an access link in the network.

The packet transmission system further comprising:

means for routing the packet to the network in accordance with the network identifier;

means for routing the packet to the termination node in accordance with the node identifier; and means for transmitting the packet from the termination node by selecting an access link of a related mobile communications network in accordance with the user identifier.

The packet transmission system further comprising:

means for routing the packet to the termination node, referring to the location address in its entirety; and means for transmitting the packet from the termination node by selecting an access link of a related mobile communications network in accordance with the user identifier.

At least the location address constituting the IP address may be transmitted to the user in the mobile communications network system or to the user inside or outside the mobile communications network system, when an access link may be established between the user in the mobile communications network system and the mobile communications network system.

The packet transmission system further comprising:

a domain-name server including a database storing an IP address in connection with a domain name;

means for having the domain-name server send the IP address back to the user in the mobile communications network system or to the user inside or outside mobile communications network system in response to an inquiry from the user about the IP address using the domain name; and means for having the user that sends the inquiry carry out a packet communication using the IP address sent back.

The inquiry may be sent to the domain-name server, if the access link is not established then an access link is established.

The domain-name server may generate the IP address by acquiring from the mobile communications network system a location address of the user in the mobile communications network system. Thus managing the IP address by the domain-name server enables packet communications by the IP address including a location address.

Furthermore, the present invention provides the packet transmission system further comprising a domain-name server including a database for storing an access link termination node in a subdivided network in the mobile communications network in connection with an IP address and a domain name; wherein the access link termination node includes:

access link management means for establishing or releasing an access link;

means for storing the location address;

means for storing user location registration information in a memory in response to a location registration request from a user, and for providing the user with the location address of the user; and means for transmitting the user location registration information to the domain-name server in response to the location registration request from the user, and wherein the domain-name server includes:

means for storing the IP address including the location address of the user;

means for receiving the user location registration information from the access link termination node; and means for updating the IP address using the user location registration information received.

The packet including the IP address may be routed in accordance with the IP address with or without encapsulating the packet.

Finally, the foregoing object of the present invention can be implemented in the form of the following packet data transmission medium. Specifically, a packet data transmission medium in a mobile communications network system for routing a packet using an IP address between a user in a mobile communications network system and a user inside or outside the mobile communications network system, the packet data transmission medium storing a location address and a user identifier of the user in the mobile communications network system into the IP address within a packet transmitted and/or received by the user in the mobile communications network system.

The location address may have a hierarchical structure.

The hierarchical structure may comprise at least a network identifier indicating a subdivided network of the mobile communications network, and a node identifier provided in connection with a termination node of an access link in the network.

The packet data transmission medium may consist of a packet data signal.

The configuration according to the present invention can facilitate the packet transmission in the mobile communications network and from the outside. This is because it incorporates the location address (LA) and user identifier as an integral part of the IP address.

BEST MODE FOR CARRYING OUT THE INVENTION

The preferred embodiments in accordance with the invention will now be described with reference to the accompanying drawings. The following preferred embodiments in accordance with the present invention are only examples of the present invention. The present invention is not limited by the embodiments, and can be implemented by other embodiments.

Figure 1:
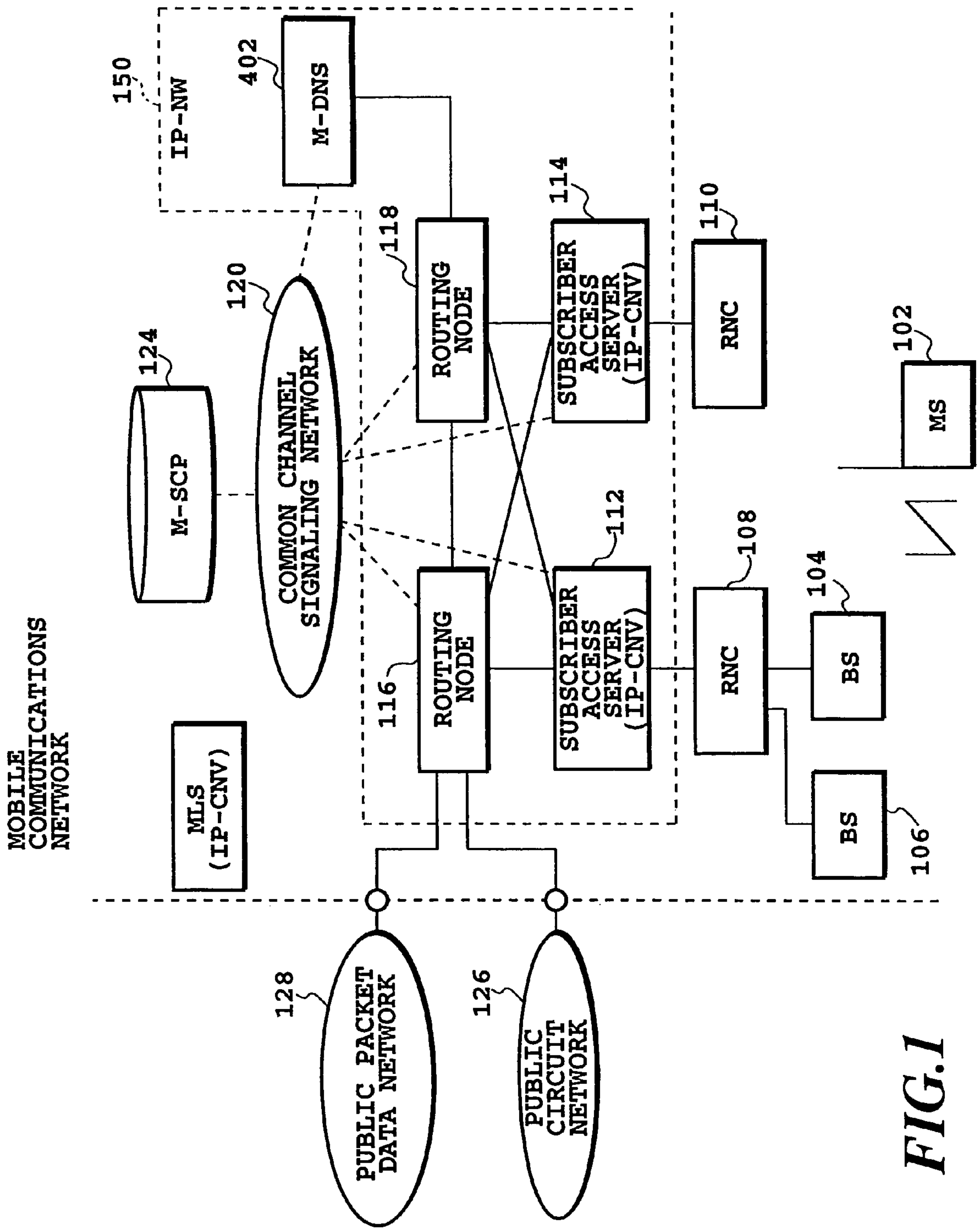
FIG. 1 is a block diagram showing a mobile communications network system for constructing a packet transmission system in accordance with the present invention.

FIG. 1 schematically shows a mobile communications network system for implementing the packet transmission in accordance with the present invention. First, a configuration of the mobile communications network system will be described.

A signal from a mobile station (MS) 102 (to which a user PC terminal or the like not shown in this figure can be connected) is received by base stations (BS) 104 and 106, passes through a radio network center (RNC) 108 or 110, and through a switching system such as a subscriber access server 112 or 114 and a routing node 116 or 118, and is connected to a user's telephone or PC terminal or the like (not shown) of an external public circuit network 126 (such as INS-C, DDX-C and the like) or of a public packet data network 128 (such as INS-P, DDX-P and the like). A mobile service control point (M-SCP) 124 functioning as a home memory for carrying out location management of mobile stations, which characterizes the mobile communications network system, is accessed through a common channel signaling network 120.

On such a mobile communications network system, is constructed a packet transmission system (IP network: IP-NW) 150 using the IP of the Internet according to the present invention. To implement it, it is necessary for the routing node or subscriber access server in the core network, a wire portion of the existing mobile communications network, to have a router function for routing in accordance with IP addresses. The router function is identical to the router function used on the Internet, which can be easily implemented by those skilled in the art. In the present invention, an IP converter (IP-CNV) characterizing the present invention is installed in the subscriber access servers 112 and 114, and a mobile domain-name server (M-DNS) 402 with special functions is installed as a domain-name server needed for the packet transmission of the Internet. These functions will be described below.

In FIG. 1, the subscriber access servers 112 and 114 include the IP-CNV operating as a link termination node, and the IP-NW 150 includes them. However, a node for installing the IP-CNV in the mobile communications network system may be the radio network centers (RNC) 108 and 110, base stations (BS) 106 and 104, or mobile station (MS) 102 in FIG. 1. Thus, the node installing the IP-CNV becomes a link termination node, and the IP-NW is composed of the node installing the IP-CNV and its higher order nodes.

In the present embodiment, the IP-CNV is installed in the subscriber access server for convenience sake. Describing the embodiment will make it obvious for those skilled in the art to apply the present invention to cases in which the IP-CNV is installed in other nodes of another mobile communications network system.

[Structure of an IP Address]

Figure 2:
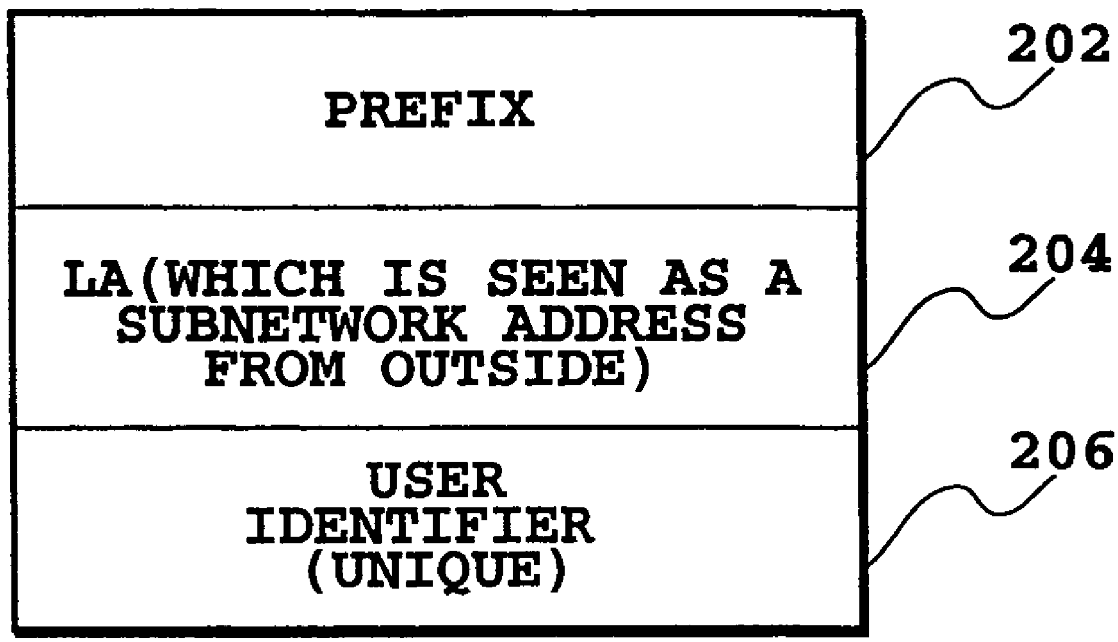
FIG. 2 is a diagram illustrating a structure of an IP address including a location address (LA) used in the present invention.

First, a structure of the IP address applied to the IP according to the present invention will be described with reference to FIG. 2. In FIG. 2, a prefix 202 is provided for indicating an address type such as a single address, multicast address or the like. Next, a location address (LA) 204, which characterizes the present invention, is provided. The location address usually corresponds to a subnetwork address. The location address is provided for each IP-CNV (such as a subscriber switching system like a subscriber access server) operating as a terminal node of the access link in the network, and constitutes the IP address of a user communicating through the Internet using a mobile station (102 of FIG. 1) under the control of the mobile switching system (112 of FIG. 1, for example). Finally, a user identifier (user ID) 206 such as a mobile station identity IMUI is provided for identifying a user. It is uniquely assigned to each user.

The IP address according to the present invention can be split into the foregoing three components, part of which includes the user identifier and the location address indicating the location of the mobile station in the mobile communications network. They are used in their entirety for identifying the user in the mobile communications network system, and for controlling the packet transmission.

Next, the hardware configuration of the M-DNS and IP-CNV characterizing the present invention will be described with reference to FIGS. 11 and 12.

[Hardware Configuration of the M-DNS]

Figure 11:
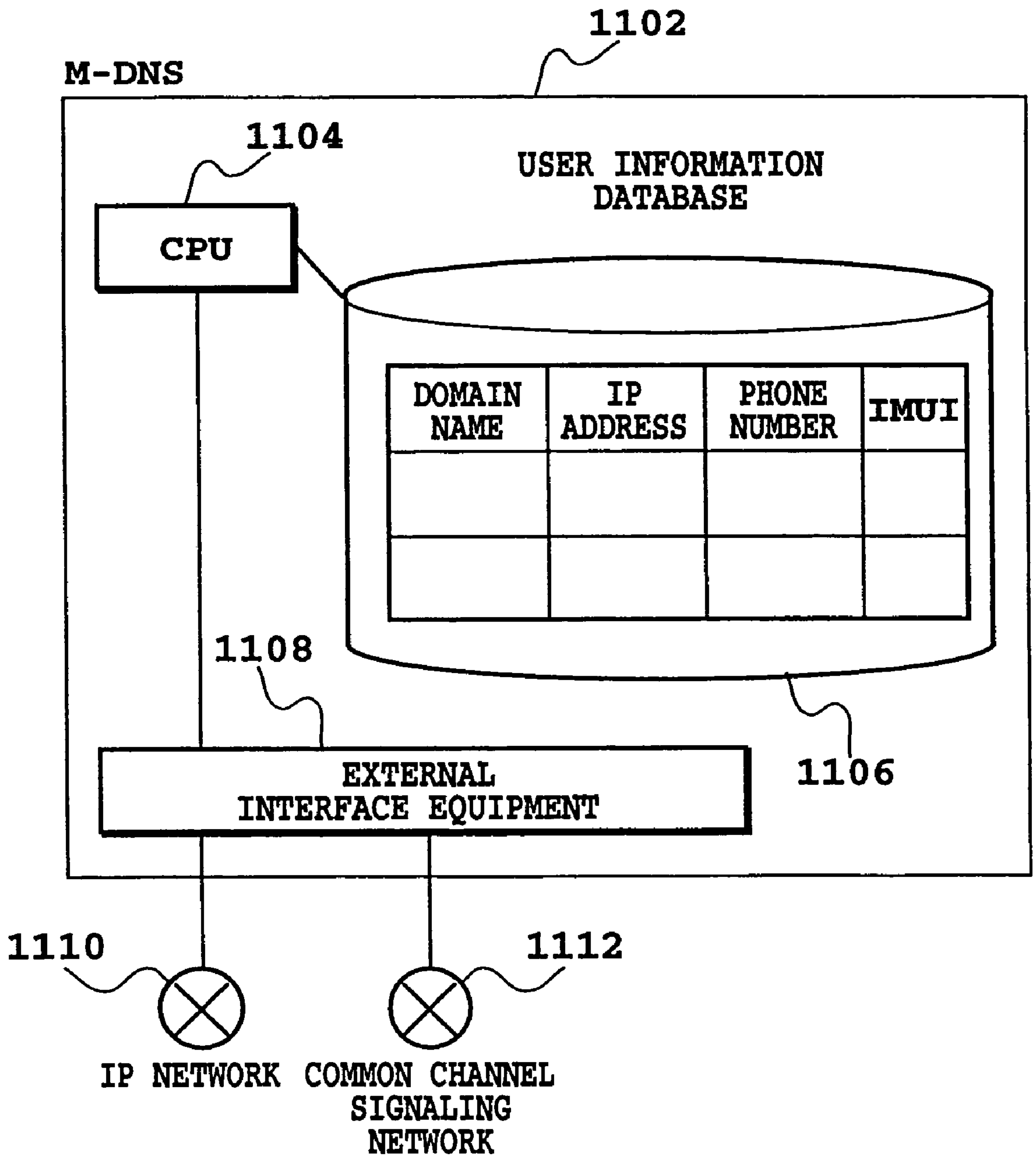
FIG. 11 is a block diagram showing a hardware configuration of an M-DNS in accordance with present invention.

A hardware configuration of an M-DNS is shown in FIG. 11. An M-DNS 1102 comprises a CPU 1104, a user information database 1106 and external interface equipment 1108. The user information database 1106 stores domain names and IP addresses (each of which includes a location address and a user identifier) in the user information, and relates them to each other. Other user information such as a telephone number or a link identifier like IMUI can also be stored and related to each other. The external interface equipment 1108 functions as an interface for connecting the M-DNS 1102 to an IP network 1110 or a common channel signaling network 1112, which can be implemented by a common router, DSU or TA well-known as Internet technology. The CPU 1104 controls the user information database 1106 and external interface equipment 1108. Specifically, as will be described later in connection with another embodiment, the CPU 1104 receives user location registration information (such as the IP address including the location address and user identifier) from the IP-CNV through the external interface equipment 1108, and updates the IP address of the user information database 1106 by the location registration information.

[Hardware Configuration of the IP-CNV]

Figure 12:
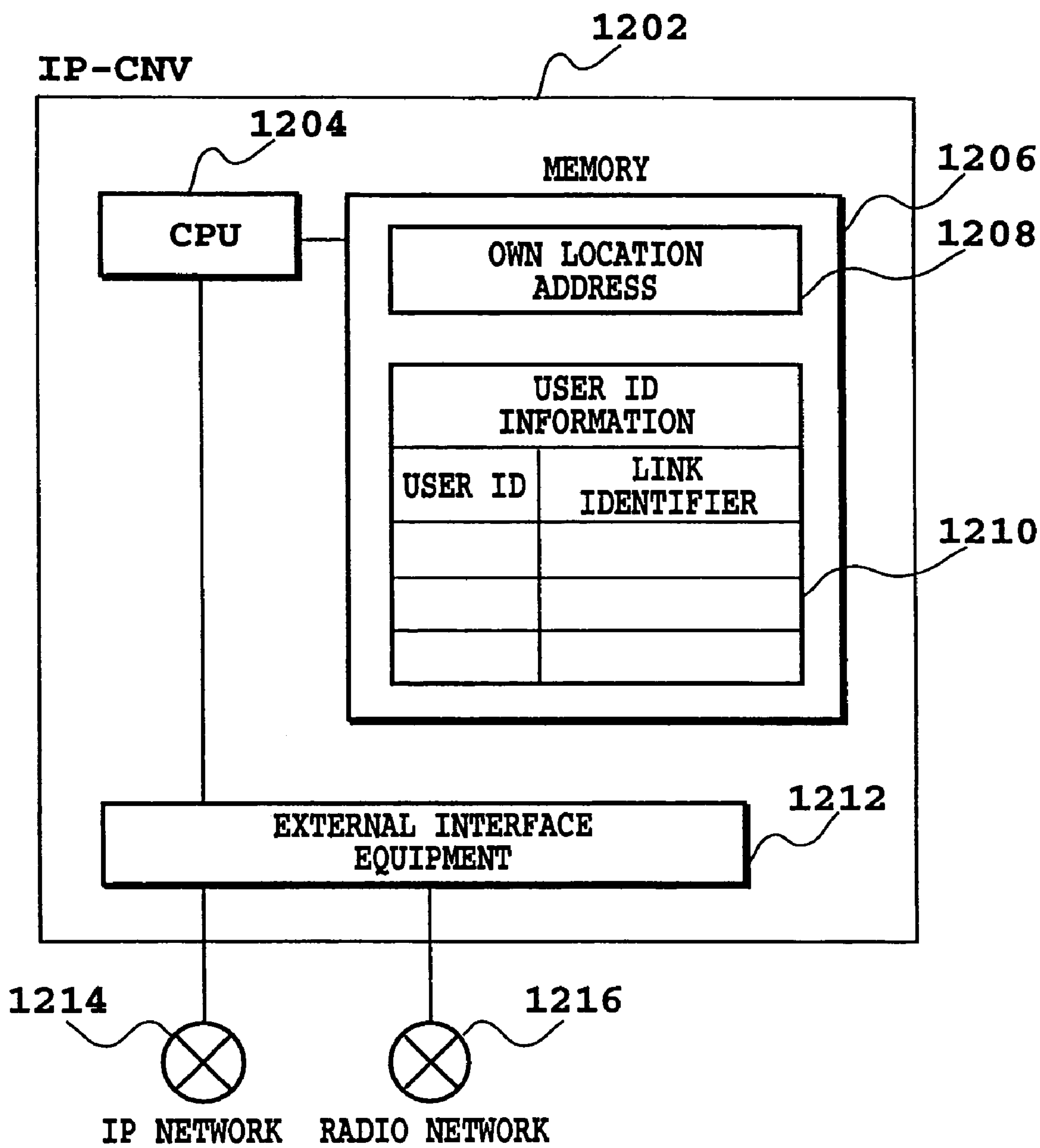
FIG. 12 is a block diagram showing a hardware configuration of an IP-CNV in accordance with the present invention.

A hardware configuration of the IP-CNV functioning as an access link termination node is shown in FIG. 12. The IP-CNV 1202 comprises a CPU 1204, a memory 1206 and external interface equipment 1212. The memory 1206 includes self-location addresses 1208 and user ID information 1210. A location address set is uniquely provided for each access link termination node (that is, for each IP-CNV), with storing its values in the memory 1206 in advance as the self-location addresses 1208. The memory 1206 also includes the user ID information 1210 for registering user identifiers corresponding to a self-visitor location subnetwork. It can also store telephone numbers and link identifiers like IMUI as other user ID information. The external interface equipment 1212 functions as an interface for connecting the IP-CNV 1202 to an IP network 1214 or a radio network 1216. For example, it functions as a router, DSU and TA that are well known in the Internet technology. The CPU 1204 controls the memory 1206 and external interface equipment 1212. Specifically, as will be described later in connection with another embodiment, the CPU 1204 carries out access link management such as establishment or release of an access link taking the opportunity of user's access link establishment request or release request, receives a user location registration request (including user identifier) through the external interface equipment 1212, stores the user identifier into the user ID information 1210 in the memory 1206, provides the user with the self-location address 1208 through the external interface equipment 1212, and transmits to the M-DNS the user location registration information (including the self-location address and the identifier of the user) in response to the location registration request from the user.

[Calling from a Mobile Station]

First, a procedure by which a terminal user of a mobile station acquires a location address (LA) and learns his or her own IP address will be described with reference to FIG. 3, when the user originates a calling through the Internet (as an IP host).

Figure 3:
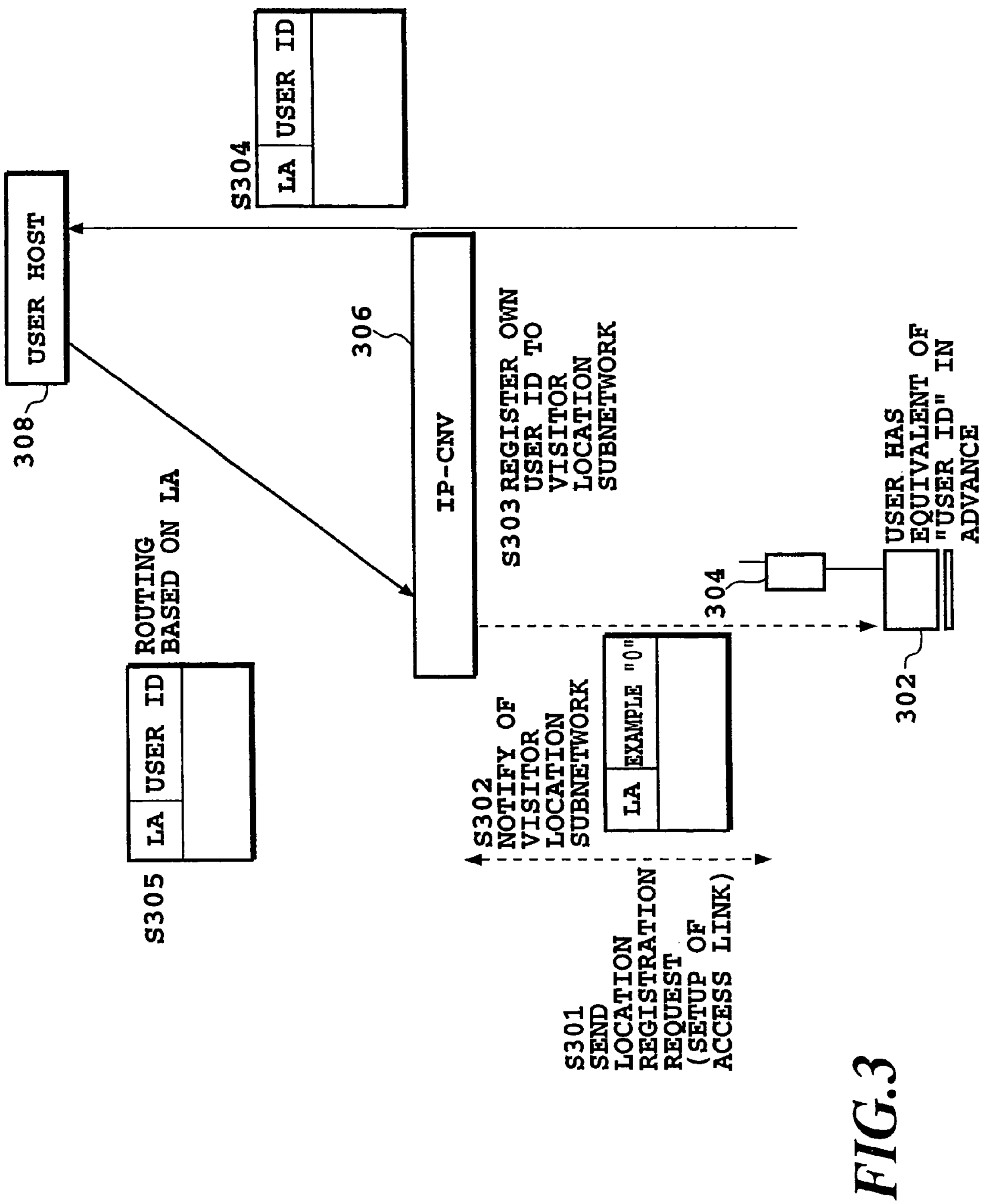
FIG. 3 is a diagram illustrating IP address acquisition when originating a packet communication from a mobile communications network in accordance with the present invention.

In FIG. 3, a terminal 302 like a mobile computer is connected to a mobile station 304. An IP-CNV 306 is installed in a subscriber switching system to be connected with the mobile station 304. The IP-CNV 306 is provided with a location address LA as a visitor location subnetwork.

The terminal 302 has the user ID described above. The user (IP host) of the terminal 302 is about to establish an Internet connection with a party user (IP client) 308 through the mobile station 304. The party user 308 may be a user either in the mobile communications system (mobile station) or in the outside of the mobile communications system (such as a public circuit network or public packet data network). The user 302 transmits a location registration request to the IP-CNV. To achieve this, the user establishes an access link using an access link management means of the IP-CNV through a normal call setup procedure of the mobile station (step 301). Receiving the user location registration request, the IP-CNV 306 notifies the terminal 302 of the self-location address (LA) (1208 of FIG. 12) prestored as the visitor location subnetwork through the setup link (step 302). Incidentally, since the user possesses his or her own user identifier, it is unnecessary for the IP-CNV to include the user identifier in the notification information. Thus, the IP-CNV can send a NULL signal ("0"s as in the present embodiment, for example) as the user ID in the notification. The terminal 302 completes its own IP address in the Internet using the notified LA. More specifically, it places the notified LA and its own user identifier in the IP address. The IP-CNV 306 registers the user ID included in the location registration request into the memory (user ID information 1210 in FIG. 12) as the user location registration information (step 303) so that the IP-CNV 306 can recognize the terminal 302 as a terminal connected to this subnetwork. The terminal 302 operates as an Internet terminal, and accesses the party user 308 using its own IP address (including the LA and user ID) as its own calling address (step 304). The user 308 assembles a packet to be transmitted to the terminal 302 by using as the terminating address (destination address) the IP address that is notified as the calling address and includes the LA of the terminal 302, so that the routing in the mobile communications network is carried out (step 305).

In this way, the terminal 302 transmits a packet using the IP address including the LA and user ID as its own address, and can receive a packet from the party.

[Calling from Another User]

A calling procedure from the party user (IP host) 308 to the user (IP client) 302 having the IP address including the LA in the mobile communications network will be described with reference to FIG. 4.

Figure 4:
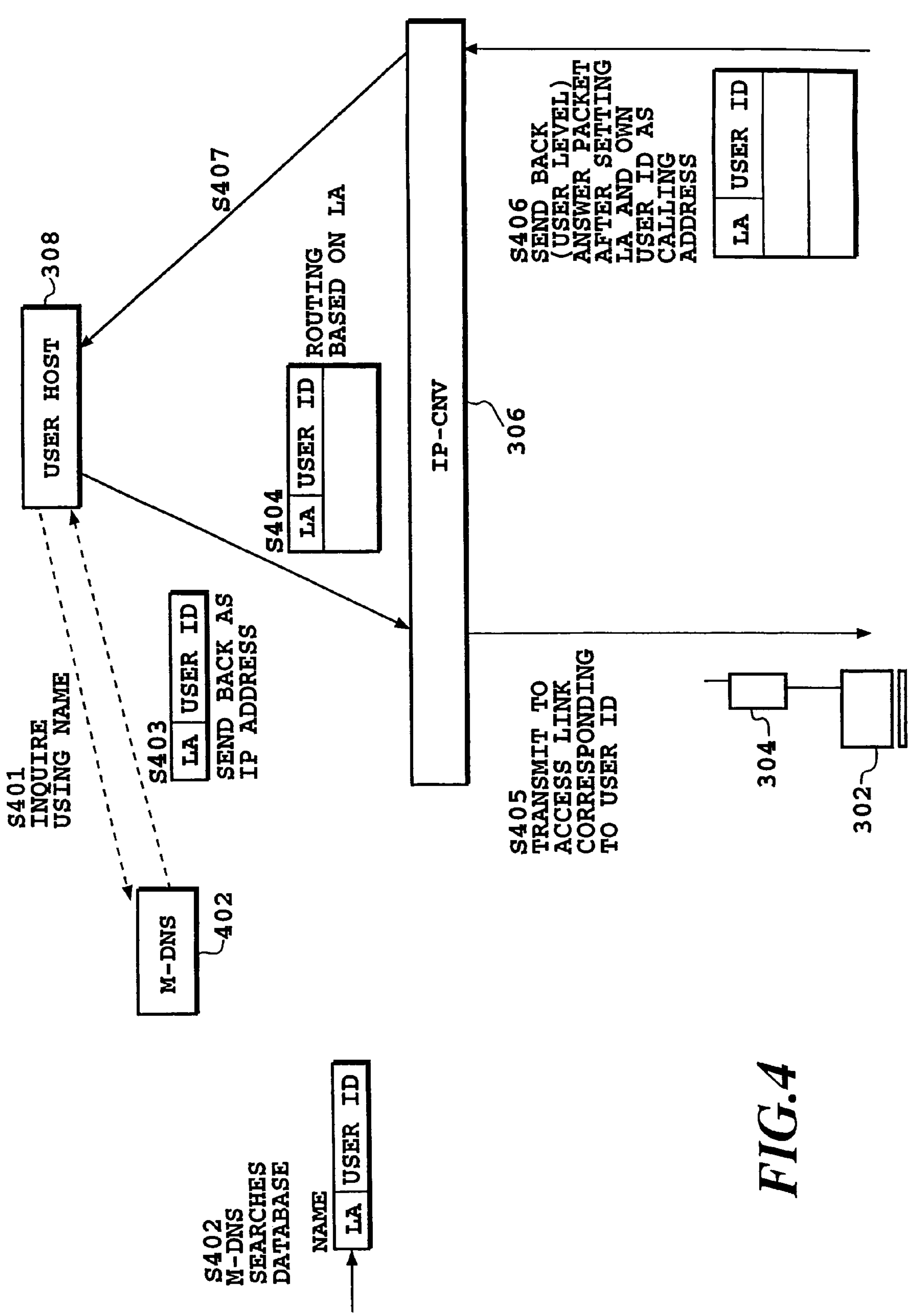
FIG. 4 is a diagram illustrating IP address acquisition when originating a packet communication from another user in accordance with the present invention.

In FIG. 4, the user 308 is about to conduct a packet communication with the user of the terminal 302 connected to the mobile station 304 in the network, using the IP address including the LA and user ID. Let us assumed here that the access link of the mobile communications network (that is, the IP-CNV) to the user 302 has already been established (establishment of such an access link is not described here, because it will be described later), and the relation between the IP address including the LA at the access link establishment and the domain name (name) of the user 302 has already been registered in the database of the M-DNS 402, the domain-name server in the mobile communications network (registration to the M-DNS is not described here, because it will be described later).

First, the user 308 sends to the M-DNS 402 an inquiry including the name of the user 302 (step 401). The M-DNS 402 searches the user information database (1106 of FIG. 11) using the name of the user 302, obtains the IP address of the user 302 including the corresponding LA and the like (step 402), and sends the IP address obtained by the search back to the user 308 (step 403). The user 308 assembles a packet using the IP address obtained as the called address (destination address) and transmits the packet. The mobile communications network carries out routing in the network up to the subnetwork IP-CNV 306 using the LA in the IP address (step 404). The IP-CNV 306 transmits the packet to the access link corresponding to the mobile station 304, using the user ID in the IP address (step 405). This enables the terminal user 302 to receive the packet transmitted from the user 308. The user 302 assembles a response packet by placing in its calling address section the IP address including its own LA, and sends the packet back to the user 308 (steps 406 and 407).

In FIG. 4, the foregoing explanation is made on the assumption that the access link has been established with the terminal 302, and the relation between the IP address including the LA of the user 302 and the domain name (name) has been registered in the M-DNS 402. The establishment of the access link and the registration to the M-DNS 402 will now be described in more detail.

[Establishment of the Access Link]

The establishment of the access link by the terminal 302 connected to the mobile station can be implemented in the following two methods.

(1) Establishment of the access link taking the opportunity of power up of the terminal.

The access link is automatically set up by the terminal 302 when the mobile station 304 and terminal 302 is turned on, that is, when the terminal 302 becomes accessible from other terminals.

Figure 5:
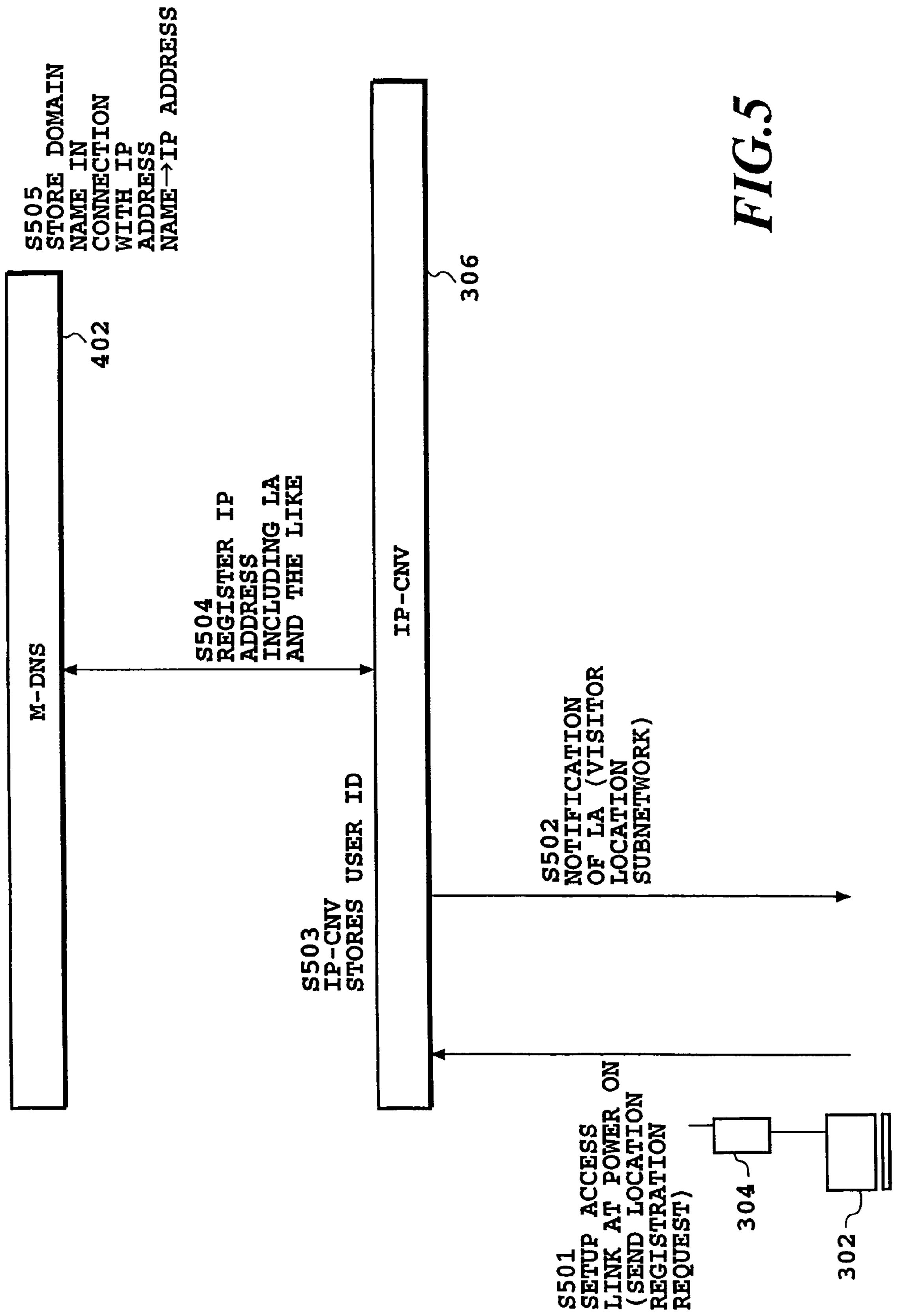
FIG. 5 is a diagram illustrating an access link setting carried out when a power supply is turned on in accordance with the present invention.

The establishment of the access link will now be described with reference to FIG. 5.

When the power of the mobile station 304 and terminal 302 is turned on, an access link is set up between the terminal 302 and the IP-CNV 306 in the same manner as the call setup in the mobile communications network (step 501). The identifier of the user is sent to the IP-CNV as a location registration request when establishing the access link. The IP-CNV 306 sends the LA (visitor location subnetwork) assigned thereto back to the terminal (step 502). The terminal 302 completes its own IP address by recording the LA received. The IP-CNV 306 stores the user ID of the terminal 302 into the user ID information area (1210 of FIG. 12) in the memory as the user location registration information, and relates the IP address of the subnetwork in the Internet with the access link as the mobile communications network (step 503). At the same time, it notifies the M-DNS 402 of the IP address including the LA of the terminal 302 (step 504). The M-DNS 402 registers it in connection with the domain name (name), using the user ID, for example (step 505).

(2) Establishment of the access link taking the opportunity of an inquiry using the name.

As illustrated in connection with FIG. 4, when accessed by another user, an inquiry is sent to the M-DNS 402, first. The access to the terminal 302, if it has not yet been established, can be carried out by establishing the access to the terminal 302 taking the opportunity of the inquiry.

To achieve this, the M-DNS 402 is configured such that it has a flag for indicating whether an access link is established or not, and commands IP-CNV 306 to establish the access link when the flag is in the OFF state (that is, when the link is not set up). This will be described in more detail with reference to FIG. 6.

Figure 6:
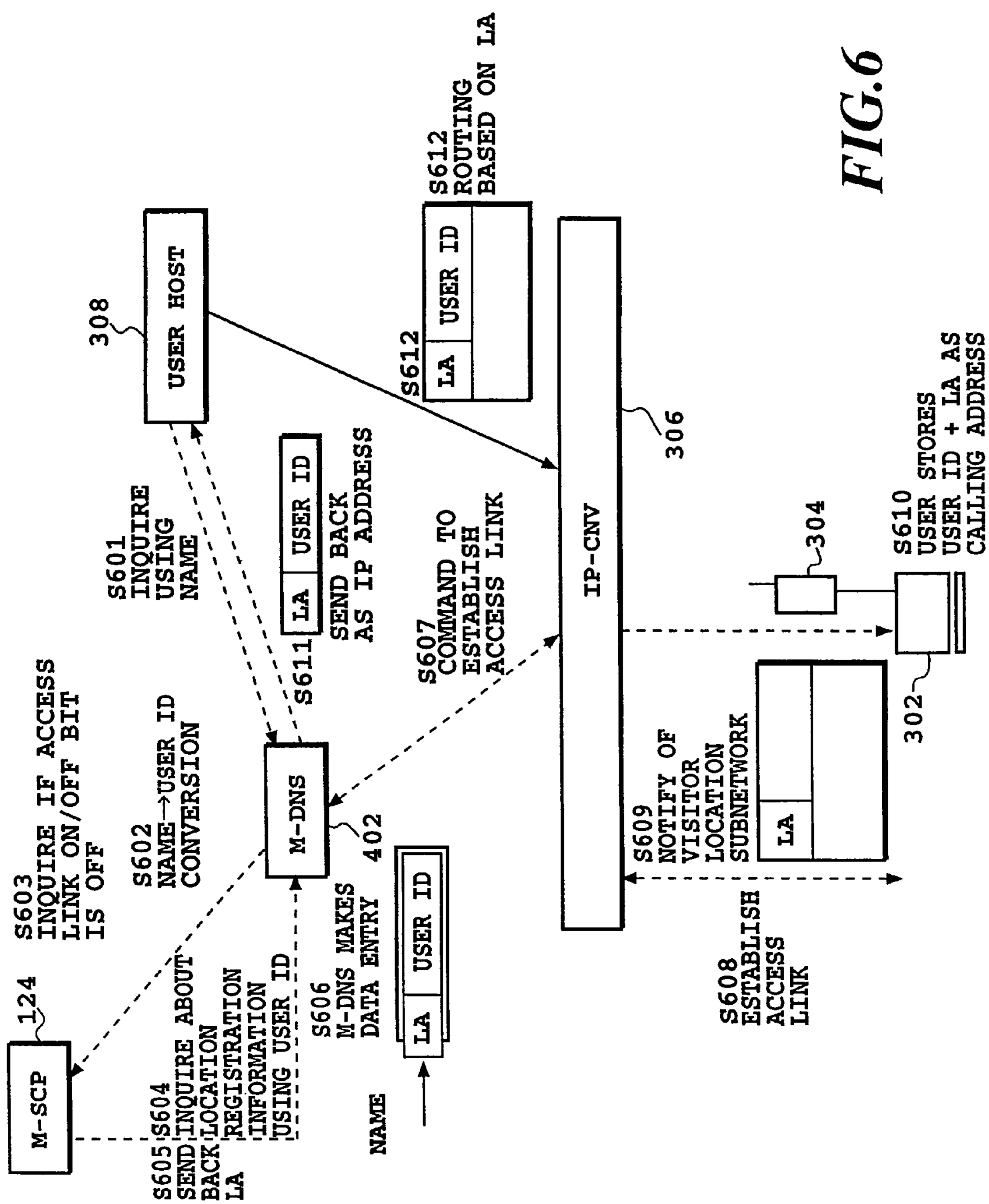
FIG. 6 is a diagram illustrating an access link setting carried out when accessing a domain-name server in accordance with the present invention.

In FIG. 6, the user 308 is about to transmit a packet to the user of the terminal 302 connected to the mobile station 304.

As in FIG. 4, the user 308 sends an inquiry including the domain name (name) to the M-DNS 402 (step 601) to have the name converted to the IP address (step 602). In this case, a complete IP address including the LA cannot be obtained, but only the user ID is obtained, because the flag indicating the access link establishment is in the OFF state. Thus, the M-DNS 402 tries to set up the access link (step 603). First, the M-DNS 402, using the user ID sends an inquiry about the location address to an M-SCP 124 that manages the location and the like of the mobile station (step 604). The user ID must be made identical to the identification number like the telephone number of the mobile station, which is used by the mobile communications network for the location management. The M-SCP 124 sends the LA indicating the location back to the M-DNS 402 (step 605), and the M-DNS 402 makes a data entry of the LA in the database (step 606). Using the LA, the M-DNS 402 commands the related IP-CNV 306 to set up an access link to the visitor mobile station 304 and terminal 302 (step 607). Receiving the command, the IP-CNV 306 establishes the access link to the visiting user 302 (step 608). The user 302 learns the visitor location subnetwork (LA) (step 609), and records the IP address including his or her own LA in the terminal (step 610).

On the other hand, the M-DNS 402 sends back to the user 308 the IP address corresponding to the name (step 611). The user 308 assembles a packet using the IP address as the destination address, and transmits the packet (step 612). The IP-CNV 306, the routing destination, can transfer the packet to the user 302 through the access link because the access link has been established by the time the packet is transferred.

In this way, the access link required can be set up taking the opportunity of the access to the M-DNS 402.

The update of the IP address including the LA that is registered in the M-DNS 402 can be made at the location update of the M-SCP.

[When Using a Telephone Number or the Like as a User Identifier of an IP Address]

There is also a system that uses a telephone number in setting up an access link to a mobile station. Although the user ID can be made identical to the telephone number intentionally, the telephone number of the mobile station substantially differs from the user ID of the IP address which is independent of the mobile station to be connected. Accordingly, in the setup taking the opportunity of the access to the M-DNS 402, the M-DNS 402 can register not only the relationship between the domain name and the IP address, but also the relationship between the domain name and the telephone number.

When setting up the access link using a unique identifier (IMUI) affixed to a mobile station unrelated to the IP address, the domain name and the IMUI can also be registered in the M-DNS 402.

Figure 7:
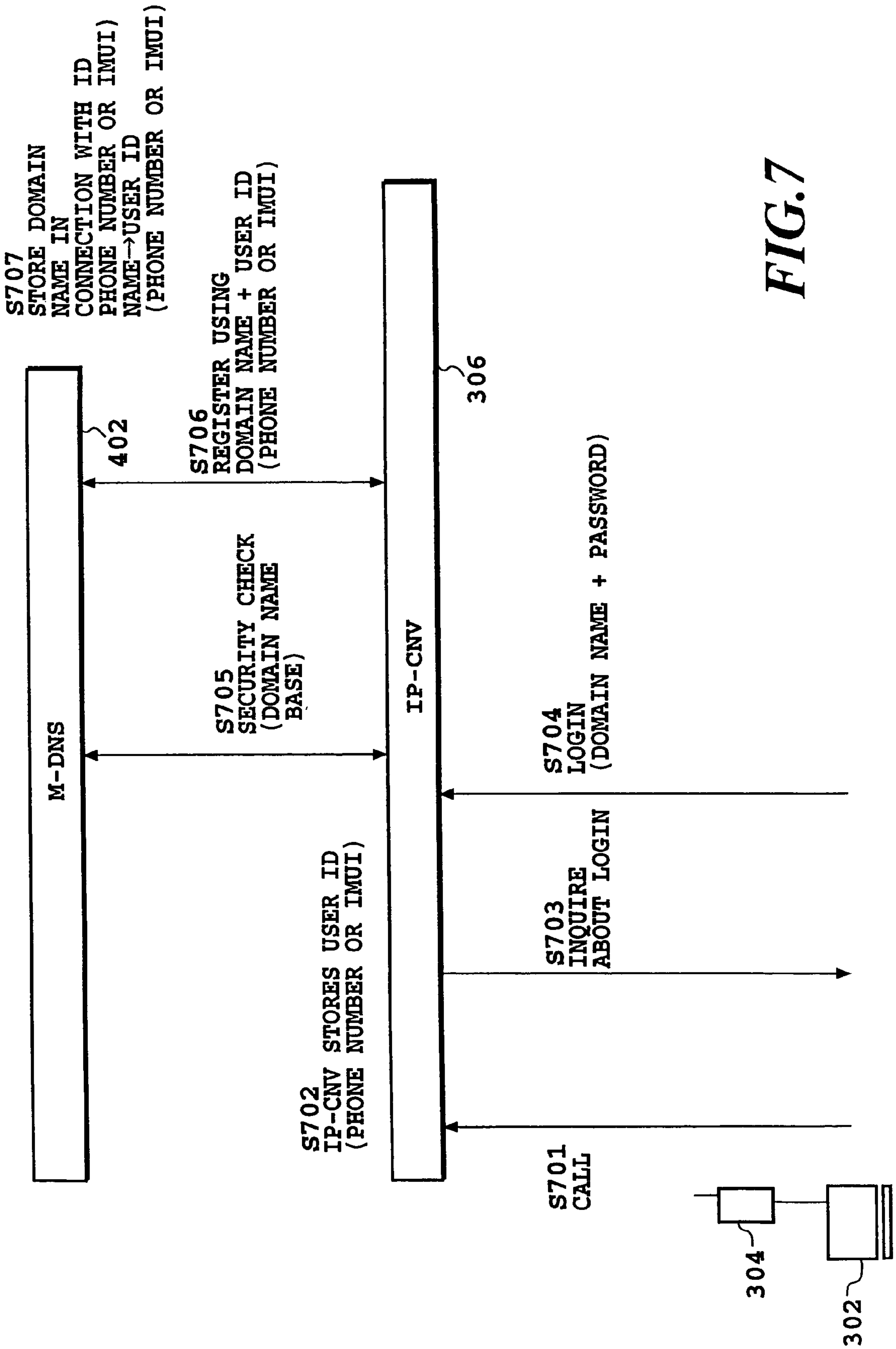
FIG. 7 is a diagram illustrating registration to a domain-name server of the correspondence between a mobile station identity IMUI and name in accordance with the present invention.

FIG. 7 is a diagram illustrating a process of registering in the M-DNS 402 the telephone number or the IMUI of the mobile station 304 in connection with the domain name (name) through a login procedure from the terminal 302 connected to the mobile station 304.

First, the terminal user 302 calls a special service that accepts the login, for example (step 701). Receiving the call, the IP-CNV 306 stores the telephone number or IMUI (step 702), and sends an inquiry to the user 302 about whether to carry out the login (step 703). The user carries out the login using his or her own domain name and password (step 704). The IP-CNV 306 makes between it and M-DNS 402 the security check of a domain name base using the password (step 705), and then registers the telephone number or IMUI stored in connection with the domain name (step 706). The M-DNS 402 stores the telephone number or IMUI in the database in connection with the domain name (step 707). Thus, the M-DNS 402 can store the telephone number or IMUI in correspondence with the name.

Using the telephone number or IMUI stored in the M-DNS 402 in connection with the name, an access link can be established taking the opportunity of the access to the M-DNS 402. This will be described in reference to FIG. 8.

Figure 8:
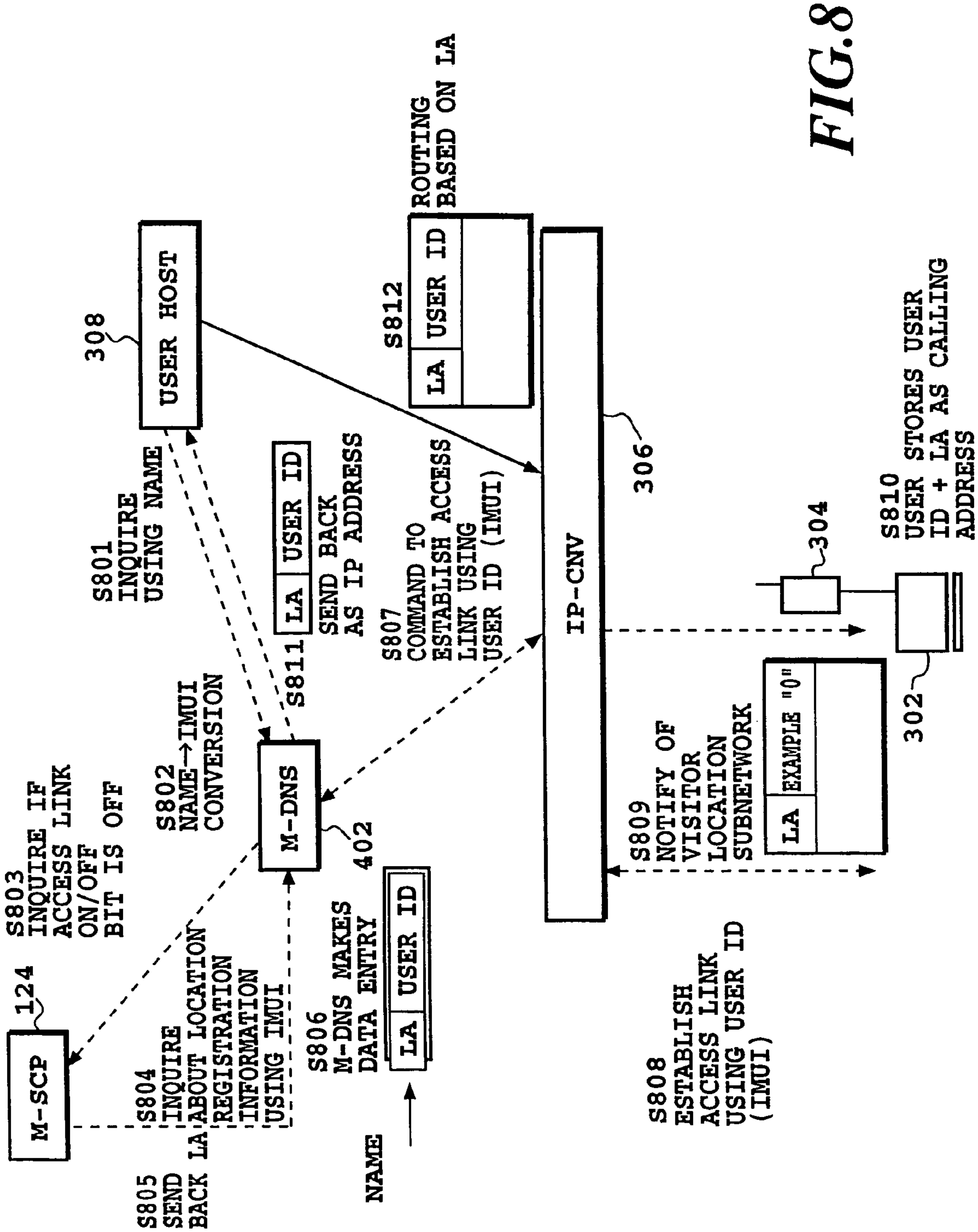
FIG. 8 is a diagram illustrating an access link setting carried out using the IMUI in accordance with the present invention.

In FIG. 8, the user 308 is about to transmit a packet to the user of the terminal 302 connected to the mobile station 304.

As in FIG. 6, the user 308 sends an inquiry including the domain name (name) to the M-DNS 402 (step 801) to have the name converted to the telephone number or IMUI (step 802). In this case, because the flag indicating the access link establishment is in the OFF state, the M-DNS 402 tries to set up the access link (step 803). First, the M-DNS 402, using the telephone number or IMUI, sends an inquiry about the location address to an M-SCP 124 that manages the location and the like of the mobile station (step 804). The M-SCP 124 sends the LA indicating the location back to the M-DNS 402 (step 805), and the M-DNS 402 makes an entry of the LA in the database to complete the IP address (step 806). The M-DNS 402 commands the IP-CNV 306 corresponding to the location obtained to set up an access link to the visitor mobile station 304 using the telephone number or IMUI (step 807). Receiving the command, the IP-CNV 306 establishes the access link to the visitor mobile station (step 808). The user 302 learns the visitor location subnetwork (LA) through the access link established (step 809), and sets up in the terminal the IP address including his or her own LA (step 810).

On the other hand, the M-DNS 402 sends back to the user 308 the IP address corresponding to the name (step 811). The user 308 assembles a packet using the IP address as the destination address, and transmits the packet (step 812). The IP-CNV 306, the routing destination, can transfer the packet to the user 302 through the access link because the access link has been established by the time the packet is transferred.

[Hierarchically Structured LA]

In the IP address as shown in FIG. 2, the location address (LA) can take a hierarchical structure. Such an example will be described with reference to FIG. 9.

Figures 9A, 9B:
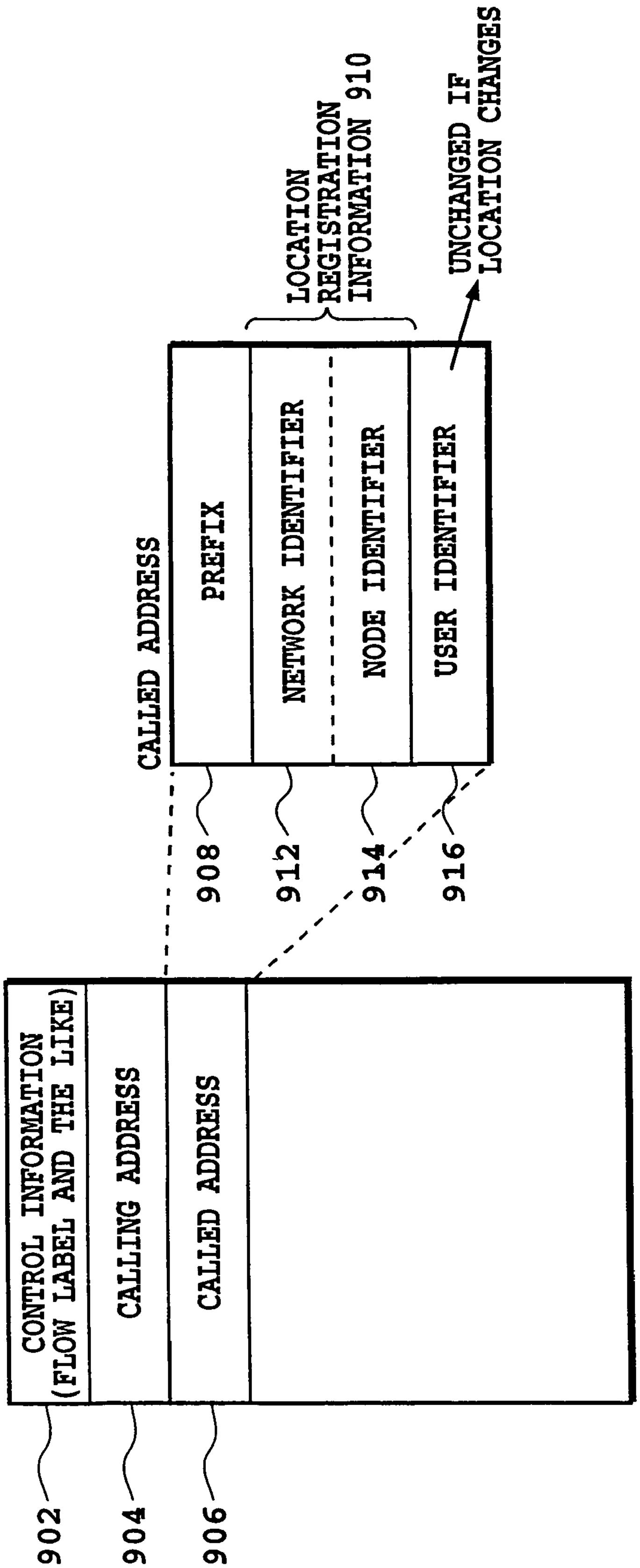
FIG. 9A and FIG. 9B are diagrams illustrating a hierarchical location address in accordance with the present invention.

FIG. 9A illustrates a packet structure. A calling address 904 and a called address 906 each include a location address (LA) with a hierarchical structure. FIG. 9B illustrates an example of the hierarchical structure. The prefix 908 in FIG. 9B indicates a type of the address structure. The LA 910 in FIG. 9B consists of a network identifier 912 and a node identifier 914. The network identifier 912 indicates a unit obtained by subdividing the mobile communications network to some areas. The node identifier 914 identifies the IP-CNV, and constitutes an interface between the packet routing and the access link to a mobile station in the mobile communications network. The user identifier (user ID) 916 is a number unique to the user, which is fixed regardless of the roaming of the user in the mobile communications network.

Figure 10:
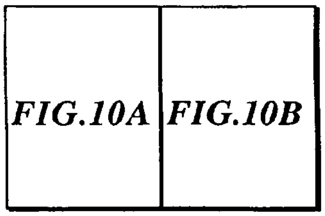
FIG. 10 is a diagram showing the relationship between FIGS. 10A and 10B.
Figure 10A:
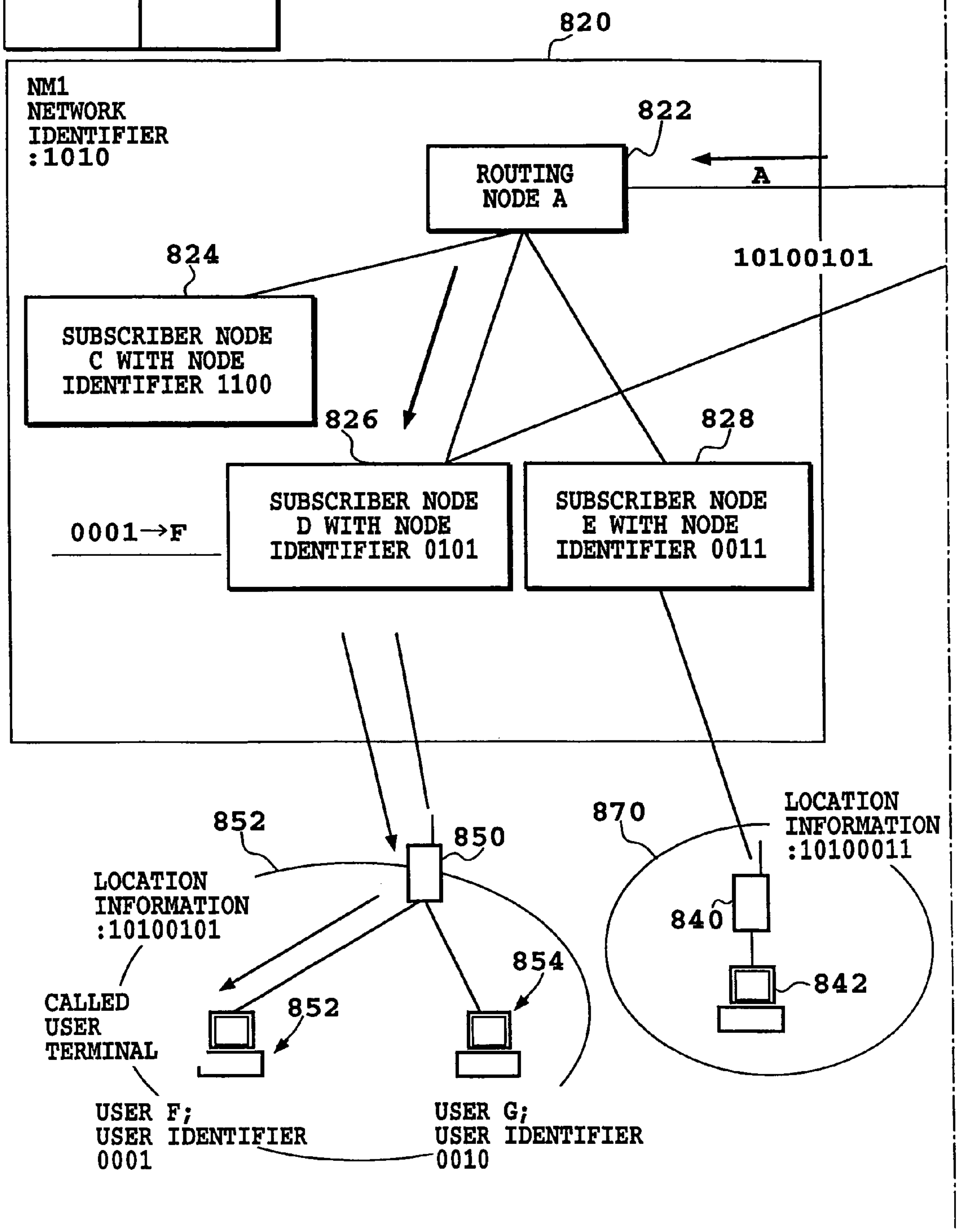
FIGS. 10A and 10B are diagrams illustrating routing carried out using a location address in accordance with the present invention.
Figure 10B:
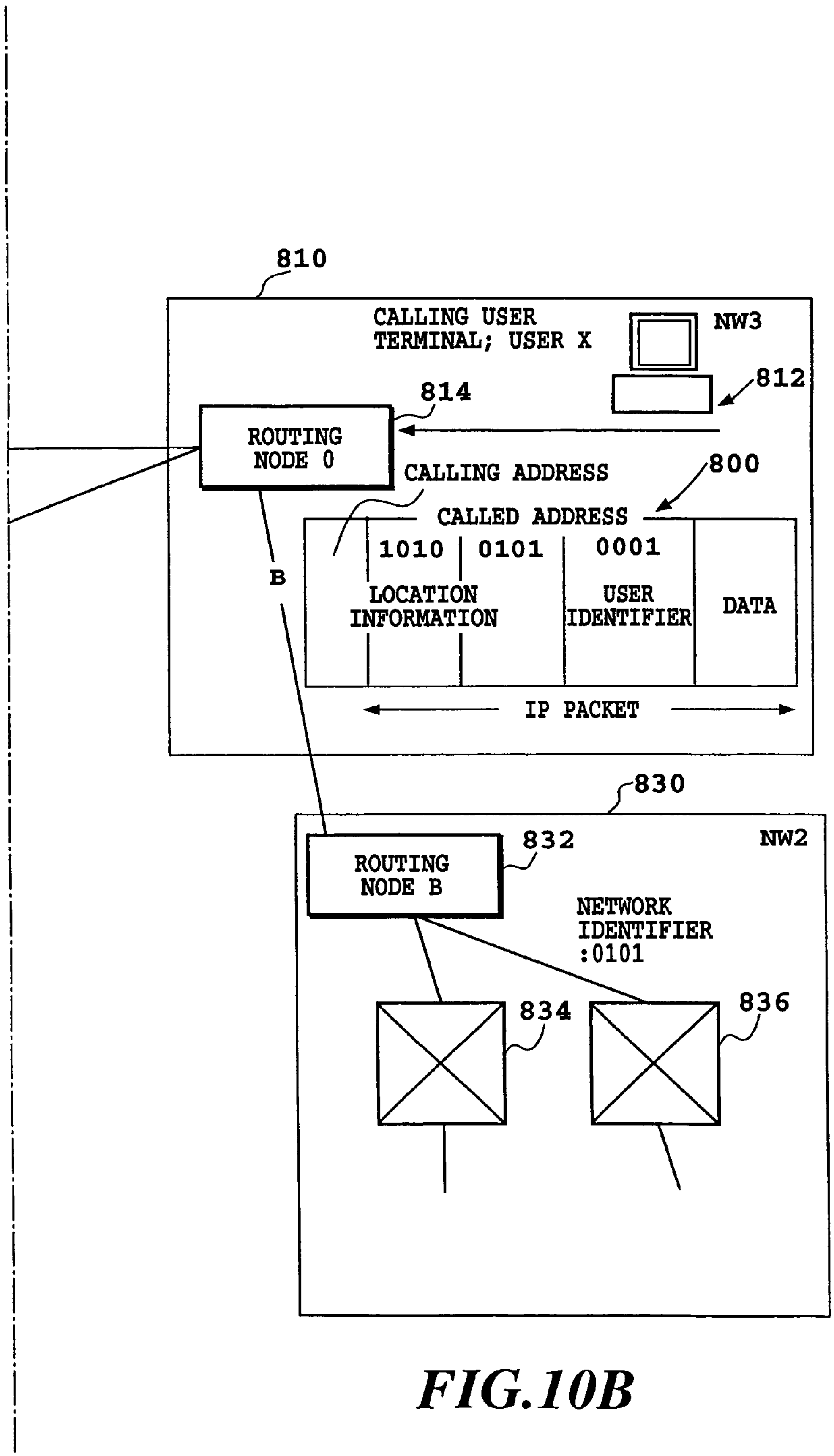

FIGS. 10A and 10B illustrate an example of routing when using, as the user identification information including the LA in the network, the total of 12 bits, consisting of a 4-bit network identifier 912, a 4-bit node identifier 914 and a 4-bit user identifier (user ID) 916.

In FIGS. 10A and 10B, a user X of a calling user terminal 812 connected to a network NW3 810 inside or outside the mobile communications network is about to transmit a packet 800 to a user F of a called user terminal connected to a mobile station 850 in a subscriber node D in NW1 820 in the mobile communications network (the network identifier, node identifier and user identifier of the called user terminal are "1010", "0101" and "0001", respectively).

The networks 820 and 830, and subscriber nodes 824, 826, 828, 834 and 836 are each provided with a network identifier and a node identifier. The network NW1 820 is provided with a network identifier "1010", and the network NW2 830 is provided with a network identifier "0101". The subscriber node C 824 is provided with a node identifier "1100", the subscriber node D is provided with a node identifier "0101", and the subscriber node E is provided with a node identifier "0011". These networks include routing nodes 814, 822 and 832 for routing packets transmitted thereto.

The packet 800 from the user terminal 812 is assigned as the calling address a network identifier, node identifier and user identifier of "1010", "0101" and "0001", and is transmitted. A routing node 0 814 in the NW3 810, to which the user terminal 812 is connected, carries out routing of the packet 800 using the network identifier (1010), and transmits it to the network NW1 820. In the network NW1 820, the routing node A 822 routs the packet to the subscriber node D 826 using the node identifier (0101).

The subscriber node D 826 sets up an access link using the user identifier (0001), and transmits the packet 800 to the mobile station 850. The mobile station 850 is connected to two terminals, one of which is the terminal 852 whose user identifier is "0001". Thus, the terminal 852 receives the packet 800.

In this way, using the network identifier and node identifier constituting the location address LA enables a direct routing to an area visited by a mobile station (an area 860 in which the user F is visiting in the foregoing example).

Although the foregoing routing is made in accordance with the location address with the hierarchical structure, direct routing of the packet 800 can also be made to the subscriber node D using the entire location address ("10100101") in the routing node 0.

Thus incorporating the location address in the address in the packet enables the direct routing of the packet using the address.

While the present invention has been described in detail with respect to preferred embodiments and methods, it will be understood that numerous modifications, changes, variations and equivalents will be made by those skilled in the art without departing from the spirit and scope of the invention.

In addition, specified elements, techniques and embodiments can also be applied to the teachings of the present invention by implementing various changes without departing from the substantial idea of the present invention. Accordingly, it is intended that the invention herein be limited only by the scope of the appended claims.

INDUSTRIAL APPLICABILITY

As described above, the packet transmission method, packet transmission system and packet data transmission medium on the mobile communications network system in accordance with the present invention is suitably applicable to the packet transmission according to the IP.

What is claimed is:

1. A processing method in a mobile communications network system for routing a packet using an IP address between a user in a mobile communications network system and a user inside or outside the mobile communications network system, the processing method comprising the steps of:

generating, at a domain-name server, an IP address of the user in the mobile communications network system including a location address of the user and a user identifier which identifies the user, by acquiring the location address from an apparatus managing a location address of the user; and storing the generated IP address in connection with a domain name of the user in the mobile communications network system, in a database in the domain-name server, the processing method further comprising the steps of:

referring to a memory managing access link establishment status of a user in the domain-name server, when an inquiry regarding the user is sent to the domain-name server;

commanding an access link termination node in whose area the user is visiting, to establish an access link, if an access link is not established for the user;

establishing, at the access link termination node, an access link between the access link termination node and the user; and providing, at the access link termination node, the user with the location address, when the access link is established.

2. The processing method as claimed in claim 1, further comprising the step of setting a flag indicating access link establishment in the memory managing access link establishment status, when the access link is established and the IP address is newly registered.

* * * * *

UNITED STATES PATENT AND TRADEMARK OFFICE

CERTIFICATE OF CORRECTION

PATENT NO. : 7,010,302 B1
APPLICATION NO. : 09/462295
DATED : March 7, 2006
INVENTOR(S) : Akihisa Nakajima et al.

It is certified that error appears in the above-identified patent and that said Letters Patent is hereby corrected as shown below:

<u>Column 8</u>
Line 38, change “assumed” to --assume--

<u>Column 9</u>
Line 15, change “302 is” to --302 are--
Line 22, change “302 is” to --302 are--

Signed and Sealed this

Twelfth Day of December, 2006

JON W. DUDAS
*Director of the United States Patent and Trademark Office*